(12) United States Patent
Yokoyama

(10) Patent No.: US 10,169,279 B2
(45) Date of Patent: Jan. 1, 2019

(54) INPUT/OUTPUT CONTROL DEVICE, INPUT/OUTPUT CONTROL SYSTEM, AND INPUT/OUTPUT CONTROL METHOD FOR CONVERSION OF LOGICAL ADDRESS OF INSTRUCTION INTO LOCAL ADDRESS OF DEVICE SPECIFIED IN INSTRUCTION

(71) Applicant: NEC Corporation, Minato-ku, Tokyo (JP)

(72) Inventor: Hiroki Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 166 days.

(21) Appl. No.: 14/996,357

(22) Filed: Jan. 15, 2016

(65) Prior Publication Data
US 2016/0217094 A1 Jul. 28, 2016

(30) Foreign Application Priority Data
Jan. 27, 2015 (JP) .................................. 2015-013467

(51) Int. Cl.
*G06F 12/00* (2006.01)
*G06F 13/40* (2006.01)
*G06F 13/42* (2006.01)

(52) U.S. Cl.
CPC ...... *G06F 13/4022* (2013.01); *G06F 13/4068* (2013.01); *G06F 13/4221* (2013.01)

(58) Field of Classification Search
CPC .... G06F 13/4022; G06F 3/0688; G06F 3/061; G06F 12/0246; G06F 3/0619
(Continued)

(56) References Cited

U.S. PATENT DOCUMENTS 4,985,828 A * 1/1991 Shimizu ............. G06F 12/1036
711/207
2008/0120487 A1* 5/2008 Saripalli ............. G06F 12/1081
711/206
(Continued)

FOREIGN PATENT DOCUMENTS

JP 2008-078887 A 4/2008
JP 2010-282387 A 12/2010
(Continued)

OTHER PUBLICATIONS

Japanese Office Action for JP Application No. 2015-013467 dated Apr. 5, 2016 with English Translation.

*Primary Examiner* — Titus Wong

(57) ABSTRACT

An input/output control device is connected to an input/output switch which transfers a received input/output instruction to an input/output device whose local address is specified in the input/output instruction. The input/output control device includes a memory and circuitry. The memory stores specific information about a processor and a conversion table for converting a logical address of the input/output device into the local address, with the specific information and the conversion table each being associated with a device group that includes the processor and the input/output device. The circuitry identifies the device group based on the specific information about the processor of sender which information is obtained. The circuitry converts the logical address included in the input/output instruction into the local address which is obtained from the conversion table for the identified device group, and then sends the input/output instruction to the input/output switch.

9 Claims, 16 Drawing Sheets

(58) Field of Classification Search
USPC .......................................................... 710/316
See application file for complete search history.

(56) References Cited

U.S. PATENT DOCUMENTS

| | | | | |
|---|---|---|---|---|
| 2009/0144508 A1* | 6/2009 | Freimuth | ............ | G06F 12/1027 |
| | | | | 711/145 |
| 2009/0154469 A1* | 6/2009 | Winter | ................ | H04L 12/4633 |
| | | | | 370/395.53 |
| 2011/0022818 A1* | 1/2011 | Kegel | ................. | G06F 12/1081 |
| | | | | 711/206 |
| 2013/0024595 A1* | 1/2013 | Subramaniyan | ........ | G06F 13/28 |
| | | | | 710/308 |
| 2014/0237156 A1* | 8/2014 | Regula | .................... | G06F 21/85 |
| | | | | 710/314 |

FOREIGN PATENT DOCUMENTS

| | | |
|---|---|---|
| JP | 2011-065551 A | 3/2011 |
| JP | 2012-146088 A | 8/2012 |

\* cited by examiner

Fig.3A

FIRST TABLE

| ID (LOCAL BUS, DEVICE NUMBER) | LOCAL ADDRESS | GROUP ID |
|---|---|---|
| BRIDGE 0 (0,0) | A' C' | 0,1 |
| BRIDGE 1 (1,0) | A' B' | 0,1 |
| ... | ... | ... |

Fig.3B

SECOND TABLE

| ID (LOCAL BUS, DEVICE NUMBER) | GROUP ID | BUS | LOGICAL ADDRESS |
|---|---|---|---|
| BRIDGE 0 (0,0) | 0 | 3 | AB |
| BRIDGE 0 (0,0) | 1 | 3 | XY |
| ... | ... | ... | ... |

Fig.3C

THIRD TABLE

| MAC ADDRESS | GROUP ID |
|---|---|
| EESV0 | 0 |
| EESV0 | 1 |
| ... | |

Fig.4A

FIRST TABLE

| ID (LOCAL BUS, DEVICE NUMBER) | LOCAL ADDRESS | GROUP ID |
|---|---|---|
| BRIDGE 0 (0,0) | A' C' | |
| BRIDGE 1 (1,0) | A' B' | |
| BRIDGE 2 (1,1) | B' C' | |
| I/O DEVICE 0 (2,0) | A' B' | |
| I/O DEVICE 1 (3,0) | B' C' | |

Fig.4B

SECOND TABLE

| ID (LOCAL BUS, DEVICE NUMBER) | GROUP ID | BUS | LOGICAL ADDRESS |
|---|---|---|---|
| BRIDGE 0 (0,0) | | | |
| BRIDGE 1 (1,0) | | | |
| BRIDGE 2 (1,1) | | | |
| I/O DEVICE 0 (2,0) | | | |
| I/O DEVICE 1 (3,0) | | | |

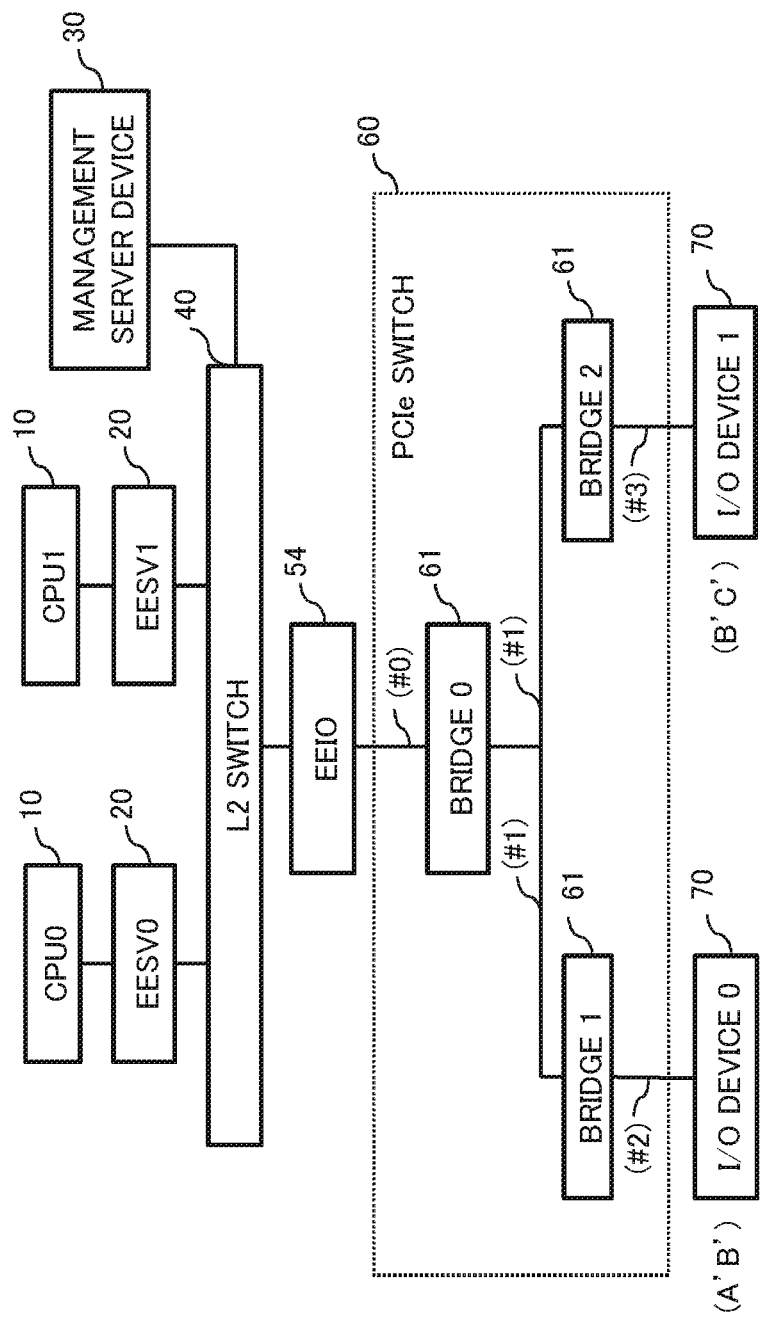

Fig.5A

FIRST TABLE

| ID (LOCAL BUS, DEVICE NUMBER) | LOCAL ADDRESS | GROUP ID |
|---|---|---|
| BRIDGE 0 (0,0) | A' C' | 0,1 |
| BRIDGE 1 (1,0) | A' B' | 0,1 |
| BRIDGE 2 (1,1) | B' C' | 0,1 |
| I/O DEVICE 0 (2,0) | A' B' | 0 |
| I/O DEVICE 1 (3,0) | B' C' | 1 |

Fig.5B

SECOND TABLE

| ID (LOCAL BUS, DEVICE NUMBER) | GROUP ID | BUS | LOGICAL ADDRESS |
|---|---|---|---|
| BRIDGE 0 (0,0) | 0 | | |
| BRIDGE 0 (0,0) | 1 | | |
| BRIDGE 1 (1,0) | 0 | | |
| BRIDGE 1 (1,0) | 1 | | |
| BRIDGE 2 (1,1) | 0 | | |
| BRIDGE 2 (1,1) | 1 | | |
| I/O DEVICE 0 (2,0) | 0 | | |
| I/O DEVICE 1 (3,0) | 1 | | |

Fig.5C

THIRD TABLE

| MAC ADDRESS | GROUP ID |
|---|---|
| EESV0 | 0 |
| EESV1 | 1 |
| ... | |

Fig.6A

FIRST TABLE

| ID (LOCAL BUS, DEVICE NUMBER) | LOCAL ADDRESS | GROUP ID |
|---|---|---|
| BRIDGE 0 (0,0) | A' C' | 0,1 |
| BRIDGE 1 (1,0) | A' B' | 0,1 |
| BRIDGE 2 (1,1) | B' C' | 0,1 |
| I/O DEVICE 0 (2,0) | A' B' | 0 |
| I/O DEVICE 1 (3,0) | B' C' | 1 |

Fig.6B

SECOND TABLE

| ID (LOCAL BUS, DEVICE NUMBER) | GROUP ID | BUS | LOGICAL ADDRESS |
|---|---|---|---|
| BRIDGE 0 (0,0) | 0 | 3 | |
| BRIDGE 0 (0,0) | 1 | | |
| BRIDGE 1 (1,0) | 0 | 4 | |
| BRIDGE 1 (1,0) | 1 | | |
| BRIDGE 2 (1,1) | 0 | 4 | |
| BRIDGE 2 (1,1) | 1 | | |
| I/O DEVICE 0 (2,0) | 0 | 5 | |
| I/O DEVICE 1 (3,0) | 1 | | |

Fig.7A

FIRST TABLE

| ID (LOCAL BUS, DEVICE NUMBER) | LOCAL ADDRESS | GROUP ID |
|---|---|---|
| BRIDGE 0 (0,0) | A' C' | 0,1 |
| BRIDGE 1 (1,0) | A' B' | 0,1 |
| BRIDGE 2 (1,1) | B' C' | 0,1 |
| I/O DEVICE 0 (2,0) | A' B' | 0 |
| I/O DEVICE 1 (3,0) | B' C' | 1 |

Fig.7B

SECOND TABLE

| ID (LOCAL BUS, DEVICE NUMBER) | GROUP ID | BUS | LOGICAL ADDRESS |
|---|---|---|---|
| BRIDGE 0 (0,0) | 0 | 3 | AB |
| BRIDGE 0 (0,0) | 1 | | |
| BRIDGE 1 (1,0) | 0 | 4 | AB |
| BRIDGE 1 (1,0) | 1 | | |
| BRIDGE 2 (1,1) | 0 | 4 | 0 |
| BRIDGE 2 (1,1) | 1 | | |
| I/O DEVICE 0 (2,0) | 0 | 5 | AB |
| I/O DEVICE 1 (3,0) | 1 | | |

Fig.8A

FIRST TABLE

| ID (LOCAL BUS, DEVICE NUMBER) | LOCAL ADDRESS | GROUP ID |
|---|---|---|
| BRIDGE 0 (0,0) | A' C' | 0,1 |
| BRIDGE 1 (1,0) | A' B' | 0,1 |
| BRIDGE 2 (1,1) | B' C' | 0,1 |
| I/O DEVICE 0 (2,0) | A' B' | 0 |
| I/O DEVICE 1 (3,0) | B' C' | 1 |

Fig.8B

SECOND TABLE

| ID (LOCAL BUS, DEVICE NUMBER) | GROUP ID | BUS | LOGICAL ADDRESS |
|---|---|---|---|
| BRIDGE 0 (0,0) | 0 | 3 | AB |
| BRIDGE 0 (0,0) | 1 | 13 | XY |
| BRIDGE 1 (1,0) | 0 | 4 | AB |
| BRIDGE 1 (1,0) | 1 | 14 | 0 |
| BRIDGE 2 (1,1) | 0 | 4 | 0 |
| BRIDGE 2 (1,1) | 1 | 14 | XY |
| I/O DEVICE 0 (2,0) | 0 | 5 | AB |
| I/O DEVICE 1 (3,0) | 1 | 15 | XY |

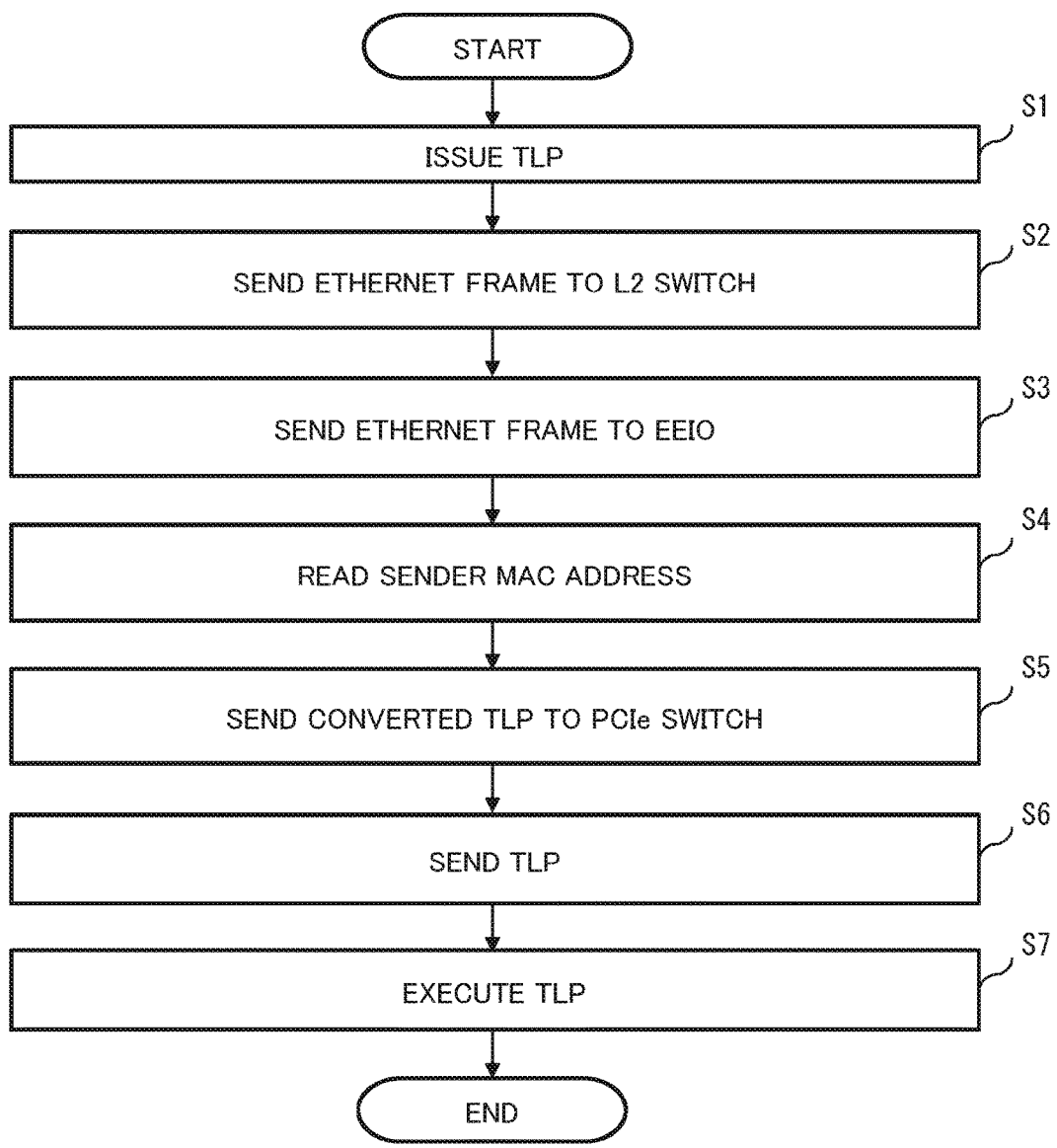

INPUT/OUTPUT CONTROL DEVICE, INPUT/OUTPUT CONTROL SYSTEM, AND INPUT/OUTPUT CONTROL METHOD FOR CONVERSION OF LOGICAL ADDRESS OF INSTRUCTION INTO LOCAL ADDRESS OF DEVICE SPECIFIED IN INSTRUCTION

This application is based upon and claims the benefit of priority from Japanese Patent Application No. 2015-013467, filed on Jan. 27, 2015, the disclosure of which is incorporated herein in its entirety by reference.

TECHNICAL FIELD

The present invention relates to a technique to add an input/output device to a system.

BACKGROUND ART

Reference Literature 1 (Japanese Unexamined Patent Application Publication No. 2008-78887) discloses a system for sharing input/out devices as well as for sharing information processing apparatuses using the PCI Express (Peripheral Component Interconnect Express) standard. The system is configured by connecting a bridge disposed on the processor side with a bridge disposed on the input/out device (hereinafter denoted as I/O (Input/Output) device) side via Ethernet®. In this system, an input/output request which is issued by the processor toward the I/O device is encapsulated into an Ethernet frame by the bridge disposed on the processor side and then sent to the bridge disposed on the I/O device side.

The left-hand area (to the left of the arrow) of FIG. 11 represents a system configuration based on the technique disclosed in Reference Literature 1. The system is configured by connecting the bridge connected on the server side (ExpEther® Server card; hereinafter abbreviated as EESV) with the bridge connected on the I/O device side (ExpEther I/O card; hereinafter abbreviated as EEIO) via a layer 2 switch (L2 switch).

The system allows for grouping of a central processing unit (CPU) and I/O devices. For example, assuming that EESV 0, EEIO 0, EEIO 2, and EEIO 3 belong to Group 0 while EESV 1 and EEIO 1 belong to Group 1, the system can group CPUs and I/O devices, each of which is connected to its bridge, into Group 0 and Group 1.

That is, CPU 0 and I/O Devices 0, 2, and 3 belong to Group 0 while CPU 1 and I/O Device 1 belong to Group 1, which is equivalent to the representation on the right-hand area (to the right of the arrow) of FIG. 11 illustrating separate configurations by group. Thus, systems based on the ExpEther technology allow for flexible configurations.

The system shown in FIG. 11 determines a group for each EEIO. A user directly connects I/O devices individually with each EEIO so that grouping can be performed for each I/O device. Such configuration requires the user to add an EEIO for every additional I/O device, resulting in higher cost.

On the other hand, FIG. 12 shows that a user can connect a large number of I/O devices under one EEIO by connecting a PCI Express switch (hereinafter denoted as PCIe switch) to the EEIO. That is to say, the user can add I/O devices at low cost. In this case, however, the system cannot perform grouping for each I/O device.

In other words, the system employing the technique disclosed in Reference Literature 1 cannot achieve low-cost addition of I/O devices while maintaining the flexibility of system configurations.

In addition, Reference Literature 2 (Japanese Unexamined Patent Application Publication No. 2012-146088) discloses a communication control system which allows for synchronization adjustment for every combination of devices. The communication control system is configured by connecting the bridge disposed on the processor side with the bridge disposed on the I/O device side via a network.

Reference Literature 3 (Japanese Unexamined Patent Application Publication No. 2010-282387) discloses a computer system which eliminates a single point of failure in a management virtual switch in a multi-root PCI switch.

SUMMARY

A primary objective of the present invention is to provide a technique that can add an I/O device at low cost while maintaining flexibility of system configuration.

An input/output control device according to an exemplary aspect of the present invention is connected to an input/output switch which transfers a received input/output instruction to an input/output device whose local address is specified in the input/output instruction, the input/output control device includes a memory that stores specific information about a processor as well as storing a conversion table for converting a logical address of the input/output device into the local address, with the specific information and the conversion table each being associated with a device group which includes the processor and the input/output device; and circuitry which has a configuration to identify the device group from the specific information about the processor of sender which information is obtained when an input/output instruction is received, convert the logical address included in the input/output instruction into the local address which is obtained from the conversion table for the identified device group, and send the input/output instruction to the input/output switch.

An input/output control system according to an exemplary aspect of the present invention includes the input/output control device according to the present invention;

the input/output switch;

a layer 2 switch that implements a network; and a bridge device and a processor that are connected to the layer 2 switch.

A method for controlling input/output according to an exemplary aspect of the present invention includes by circuitry, storing, into a memory, specific information about a processor as well as storing a conversion table for converting a logical address of an input/output device into a local address, with the specific information and the conversion table each being associated with a device group which includes the processor and the input/output device; and identifying the device group from specific information about the processor of sender which information is obtained when an input/output instruction is received, converting the logical address included in the input/output instruction into the local address which is obtained from the conversion table for the identified device group, and sending the input/output instruction to an input/output switch which transfers the instruction to the input/output device at the local address specified in the input/output instruction.

BRIEF DESCRIPTION OF THE DRAWINGS

Exemplary features and advantages of the present invention will become apparent from the following detailed description when taken with the accompanying drawings in which:

FIG. 3A illustrates an example structure of a first table which is a conversion table;

FIG. 3B illustrates an example structure of a second table which is a conversion table;

FIG. 3C illustrates an example structure of a third table which is a conversion table;

FIG. 4A illustrates an example structure of the first table being used during a process in a group forming phase;

FIG. 4B illustrates an example structure of the second table being used during the same process as in FIG. 4A;

FIG. 4C illustrates an example configuration of the input/output control system existing during the same process as in FIG. 4A;

FIG. 5A illustrates an example structure of the first table being used during another process in the group forming phase;

FIG. 5B illustrates an example structure of the second table being used during the same process as in FIG. 5A;

FIG. 5C illustrates an example structure of the third table being used during the same process as in FIG. 5A;

FIG. 6A illustrates an example structure of the first table being used during further other process in the group forming phase;

FIG. 6B illustrates an example structure of the second table being used during the same process as in FIG. 6A;

FIG. 7A illustrates an example structure of the first table being used during further other process in the group forming phase;

FIG. 7B illustrates an example structure of the second table being used during the same process as in FIG. 7A;

FIG. 8A illustrates an example structure of the first table being used during furthermore other process in the group forming phase;

FIG. 8B illustrates an example structure of the second table being used during the same process as in FIG. 8A;

FIG. 9 is a flowchart showing example operations of the input/output control system during an input/output execution phase;

EXEMPLARY EMBODIMENT

<Overview>

Figure 1:
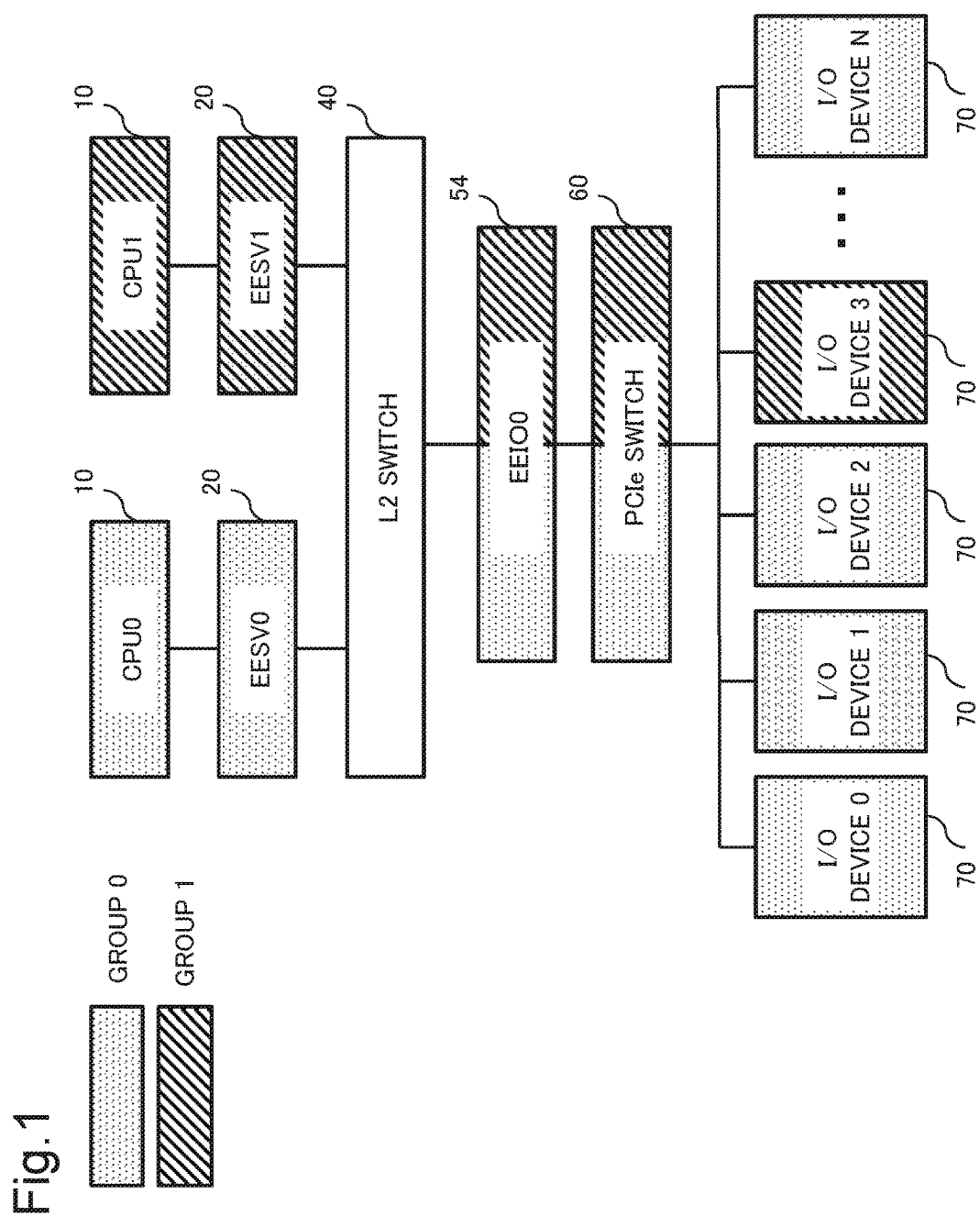
FIG. 1 illustrates an example configuration of a system according to the present invention.

FIG. 1 is a block diagram illustrating an example configuration of a system according to the present invention. The system according to an exemplary embodiment of the present invention allows for dividing a plurality of I/O devices 70, which are individually connected to one EEIO 54 and are combined with a CPU 10, into a plurality of groups (device groups). The CPU 10 is thus capable of inputting/outputting information through the use of I/O devices 70 belonging to the same group.

Specifically, in the system illustrated in FIG. 1, the plurality of I/O devices 70 (from I/O Device 0 to I/O Device N, totaling to N+1 devices) are connected to one EEIO (EEIO 0) 54. And then, the EEIO 54 is connected a plurality of the CPUs (CPU 0 and CPU 1) 10 via a layer 2 switch (hereinafter denoted as L2 switch) 40.

In the illustrated system, the CPU (CPU 1) 10 and the I/O device (I/O Device 3) 70 form Group 1. The CPU (CPU 0) 10 and the other I/O devices (I/O Devices 0, 1, 2, 4, ... N) 70 form Group 0. As a result of such grouping, the CPU (CPU 1) 10 is capable of inputting/outputting information through the use of the I/O device (I/O Device 3) 70. The CPU (CPU 0) 10 is capable of inputting/outputting information through the use of the other I/O devices (I/O Devices 0, 1, 2, 4, ... N) 70.

First Exemplary Embodiment

<Configuration>

Figure 2:
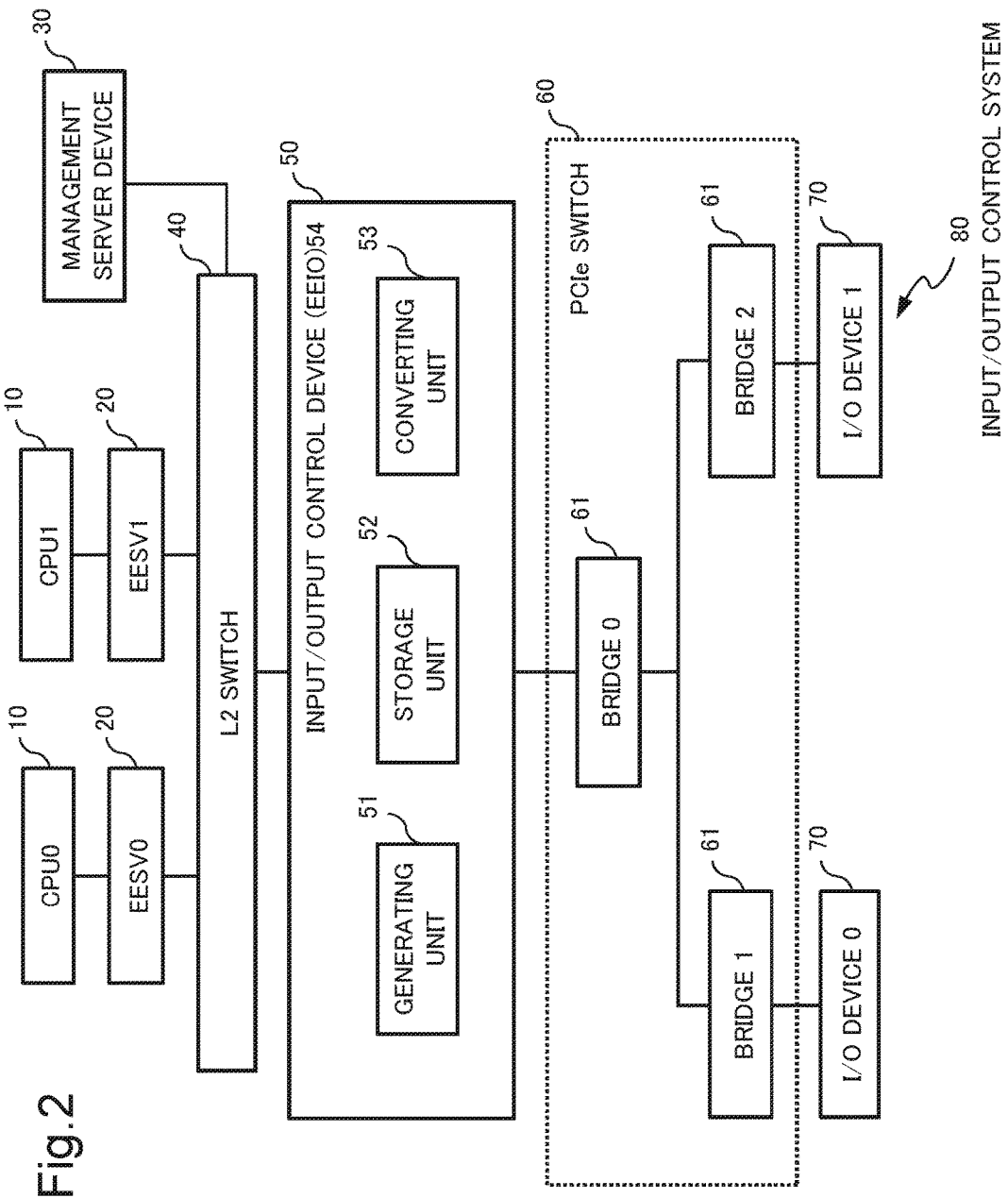
FIG. 2 illustrates a configuration of an input/output control system according to a first exemplary embodiment of the present invention.
Figure 6C:
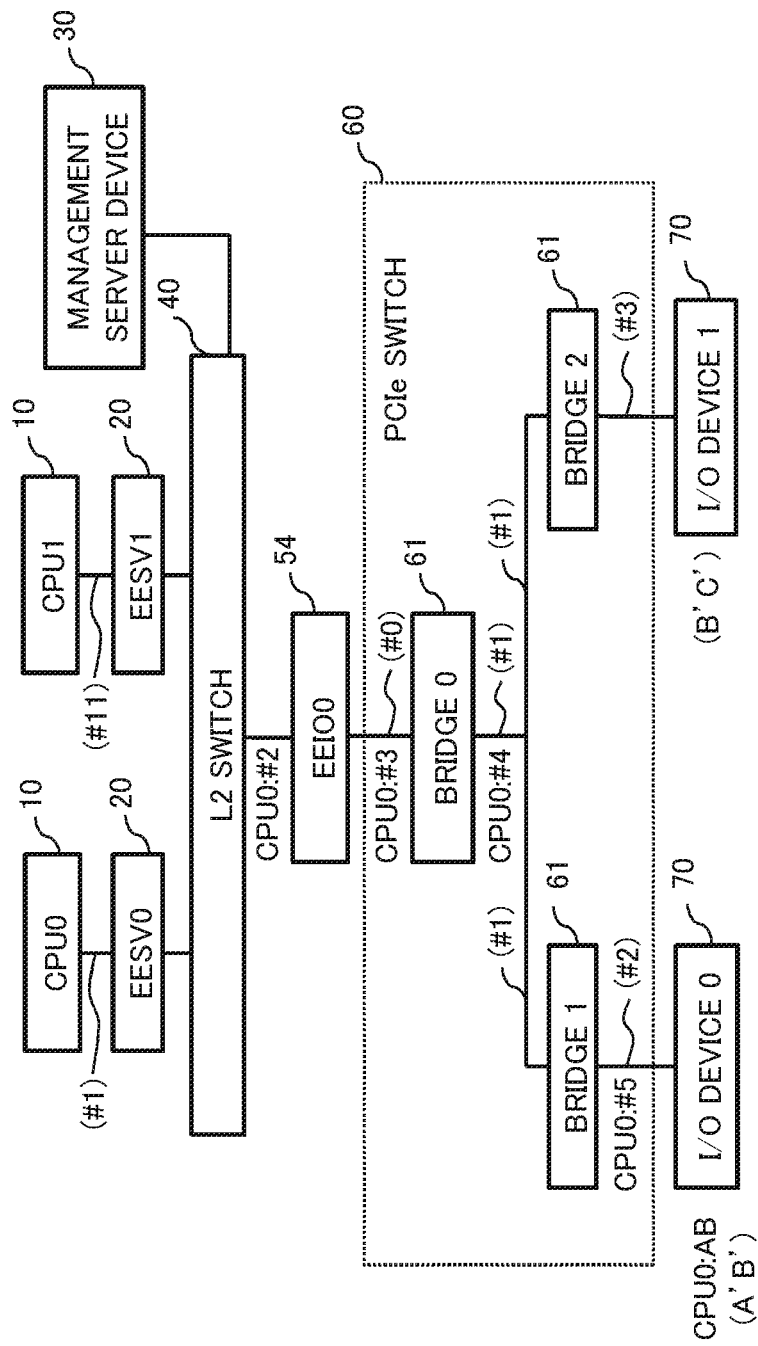
FIG. 6C illustrates an example configuration of the input/output control system existing during the same process as in FIG. 6A.

FIG. 2 illustrates a configuration of an input/output control system according to a first exemplary embodiment of the present invention. In the input/output control system 80, the plurality of CPUs 10 are connected to the L2 switch 40 via respective EESVs (EESV 0 and EESV 1) 20 of the same group. The example in FIG. 2 shows that the CPU (CPU 0) 10 is connected to the L2 switch 40 via the EESV (EESV 0) 20. The example also shows that the CPU (CPU 1) 10 is connected to the L2 switch 40 via the EESV (EESV 1) 20.

In the input/output control system 80, a plurality of I/O devices (I/O Device 0 and I/O Device 1) 70 are connected to the L2 switch 40 via an EEIO 54 and a PCIe (PCI Express) switch 60.

Note that the number of pairs of the CPU 10 and the EESV 20 and the number of pairs of the EEIO 54 and the PCIe switch 60, all of which are connected to the L2 switch 40, are not limited to the numbers represented in FIG. 2. Likewise, the number of I/O devices 70 connected to the PCIe switch 60 is not limited to the number represented in FIG. 2.

In the first embodiment, the EEIO 54 has additional features specific to the present invention and may be referred to as an input/output control device 50. The following are major additional features:

1) The EEIO 54 handles accesses from the plurality of CPUs 10. For this purpose, the EEIO 54 retains configuration information that is associated with each of the plurality of groups. Specifically, conversion tables are associated with groups and retain configuration information.

2) The PCIe switch 60 handles accesses from the plurality of CPUs 10. For this purpose, the EEIO 54 uses conversion tables to convert an address included in an input/output instruction given by any of the plurality of CPUs 10 into another address.

3) The EEIO 54, when generating conversion tables, defines a register for the I/O device 70 beneath the EEIO 54.

For this purpose, the EEIO 54 performs configuration access to the I/O device 70 beneath the EEIO 54.

4) The EEIO 54 assigns a group ID (IDentification) to each of the I/O devices 70 and the CPUs 10.

In the input/output control system 80, the CPU 10 issues an input/output instruction compliant with the PCI Express standard. The instruction is then encapsulated into an Ethernet frame by an EESV 20 and transferred to the appropriate EEIO 54 via the L2 switch 40. The EEIO 54 takes out the input/output instruction from the Ethernet frame, performs appropriate address conversion, and then outputs the instruction to the PCIe switch 60.

The EEIO 54 includes a generating unit 51, a storage unit 52, and a converting unit 53. The generating unit 51 generates a conversion table (described later) and stores it into the storage unit 52. The converting unit 53 performs conversion on an address of the I/O device 70 contained in the input/output instruction by referring the conversion table and then outputs the instruction to the PCIe switch 60.

The generating unit 51 and the converting unit 53 are composed of logic circuits. Alternatively, the generating unit 51 and/or the converting unit 53 may be implemented by a processor (not shown) included in the EEIO 54, which can also serve as a computer, or may be implemented by a program executed by the processor. The storage unit 52 is a storage medium such as semiconductor memory. The storage unit 52 stores the conversion table and specific information (identification information) to specify the CPU 10.

The PCIe switch 60 includes a plurality of bridges 61. The PCIe switch 60 selects the I/O device 70 to which the input/output instruction should be sent based on the address of the I/O device 70 included in the instruction, and then passes the instruction to the selected I/O device 70. In the example shown in FIG. 2, the PCIe switch 60 includes three bridges (Bridge 1 to Bridge 3) 61. The EEIO 54 is connected to the I/O device (I/O Device 0) 70 through the bridges (Bridge 0 and Bridge 1) 60. In addition, the EEIO 54 is connected to the I/O device (I/O Device 1) 70 through the bridges (Bridge 0 and Bridge 2) 60.

The I/O device 70 is an input/output device compliant with the PCI Express standard.

In the input/output control system 80, a management server device 30 is connected to the L2 switch 40. The management server device 30 manages the connection configuration of the input/output control system 80 as well as obtaining information about grouping of the CPUs 10 and the I/O devices 70 from an administrator. In this way, the management server device 30 determines the groups and their respective subordinate the CPUs 10, the I/O devices 70, and even the bridges 61, and then outputs the determination to the EEIO 54.

The conversion tables generated by the generating unit 51 include a first table shown in FIG. 3A, a second table shown in FIG. 3B, and a third table shown in FIG. 3C.

The first table holds local addresses and group IDs, each of which is associated with an ID of each of the bridges 61 and the I/O devices 70 (both are hereinafter collectively called devices). The local address, as used herein, is a memory address or I/O address or prefetchable address assigned by the EEIO 54 to an I/O device 70.

The ID for identifying each device is a combination of a local bus number and a device number. The local bus number is a bus number assigned by the EEIO 54 to the device. The device number is given for the purpose of handling devices separately.

The second table holds group IDs, bus numbers, and logical addresses, each of which is associated with a device ID. The bus number is assigned by the CPU 10 to the device. The logical address is a memory address, I/O address or prefetchable address assigned by the CPU 10 to the device.

The third table stores the group IDs, each of which is associated with a MAC address. The MAC address is the MAC address of an EESV 20. Upon receipt of the Ethernet frame from the EESV 20, the generating unit 51 and the converting unit 53 in the EEIO 54 take out a sender MAC address from the Ethernet frame, and then retrieve the group ID associated with the taken sender MAC address from the third table. In other words, the generating unit 51 and the converting unit 53 identify the group to which the CPU 10 issuing the input/output instruction belong, based on the MAC address of the EESV 20.

<Operations>

Operations of the input/output control system 80 are broadly divided into a group forming phase and an input/output executing phase.

<Operations in Group Forming Phase>

In the group forming phase, the generating unit 51 in the EEIO 54 performs: 1) generation of conversion tables; and 2) definition of groups (assigning group IDs to I/O devices 70 and CPUs 10). These two operations may or may not be performed in the order mentioned above.

FIGS. 4A, 5A, 6A, 7A, and 8A respectively show the state of the first table (conversion table) in each operation process of the group forming phase. FIGS. 4B, 5B, 6B, 7B, and 8B respectively show the state of the second table (conversion table) in each operation process of the group forming phase. FIG. 5C shows the state of the third table (conversion table) in the operation process of the group forming phase. FIGS. 4C, 6C, 7C, and 8C respectively show information about the system configuration in each the operation process of the group forming phase.

1) Generation of Conversion Tables

After the system is powered on, the generating unit 51 in the EEIO 54 identifies the configuration of lower-level devices using a method similar to initialization performed by a PCI Express management software program, and then sets local addresses and local bus numbers into device registers. During this operation, the generating unit 51 stores IDs (local bus number, device number) into the first and second tables and local addresses into the first table (see FIGS. 4A and 4B).

It is assumed here that the bridges (Bridge 0, Bridge 1, and Bridge 2) 61 and the I/O devices (I/O Device 0 and I/O Device 1) 70 have local bus numbers 0, 1, 1, 2, and 3, respectively (these numbers are shown with # in parentheses in FIG. 4C). It is further assumed that the local address of the I/O device (I/O Device 0) 70 ranges from A' to B' (hereinafter denoted as A'B'; the same applies to other addresses) and that the local address of the I/O device (I/O Device 1) 70 is B'C'. In this case, the generating unit 51 stores the following information (data) as device IDs: Bridge 0 (0,0), Bridge 1 (1,0), Bridge 2 (1,1), I/O Device 0 (2,0), and I/O Device 1 (3,0).

In addition, the generating device 51 stores A'C', A'B', B'C', A'B', and B'C', as the local addresses of the bridges (Bridge 0, Bridge 1, and Bridge 2) 61 and I/O devices (I/O Device 0 and I/O Device 1) 70, respectively. Note that the addresses of the bridge (Bridge 1) 61 and bridge (Bridge 2) 61 under the EEIO 54 are A'B' and B'C', respectively, and thus the bridge (Bridge 0) 61 has the local address of A'C', a range combining both. These values are calculated and written to the conversion table by the generating unit 51.

2) Definition of Groups

The generating unit 51 notifies the management server device 30 of the configuration of devices under the EEIO 54. The management server device 30, recognizing every device, can define forming of device groups.

The system administrator inputs information about forming of the group of the CPU 10 and the I/O device 70 to the management server device 30. For example, assuming that Group 0 includes the CPU (CPU 0) 10 and the I/O device (I/O Device 0) 70 while Group 1 includes the CPU (CPU 1) 10 and the I/O device (I/O Device 1) 70, the administrator inputs this group forming information to the management server device 30.

After being provided with both information about configuration of the input/output control system 80 and information about group forming, the management server device 30 checks the two pieces of information against each other to approve the following group forming and notifies the generating unit 51 of the approved group forming.

- The I/O device (I/O Device 0) 70 belongs to Group 0 while the I/O device (I/O Device 1) 70 belongs to Group 1.
- The bridges (Bridge 0, Bridge 1, and bridge 2) 61 are shared by Groups 0 and 1.
- The MAC address of Group 0 is the MAC address of the EESV (EESV 0) 20 while the MAC address of Group 1 is the MAC address of the EESV (EESV 1) 20.

Upon receipt of the information about group forming from the management server device 30, the generating unit 51 stores into the first and second tables the group IDs to which each device belong (see FIGS. 5A and 5B). For any device shared by the plurality of groups, the generating unit 51 adds a row corresponding to each group in the second table.

Furthermore, the generating unit 51 stores the MAC addresses and the group IDs into the third table (see FIG. 5C).

FIGS. 5A and 5B show that the first and second tables contain the information (data) representing that the I/O device (I/O Device 0) 70 has the group ID 0 while the I/O device (I/O Device 1) 70 has a group ID 1. FIGS. 5A and 5B further show that the first and second tables contain the information (data) representing that the bridges (Bridge 0, Bridge 1, and Bridge 2) 61 have the group IDs 0 and 1. Having group IDs 0 and 1 means herein that the device is shared by two groups whose the IDs are 0 and 1.

FIG. 5C shows that the third table contains the information (data) representing that the MAC address of the EESV (EESV 0) 20 is associated with the group ID 0 while the MAC address of the EESV (EESV 1) 20 is associated with the group ID 1.

Note that the management server device 30 may not necessarily exist if the input/output control system 80 has only one EEIO (EEIO) 54. Alternatively, the generating unit 51 may serve as the management server device 30.

The CPU 10, e.g., the CPU (CPU 0) 10, searches buses at the time when the operating system (OS) is started or a similar event occurs. It is assumed here that the bus between the CPU (CPU 0) 10 and the EESV (EESV 0) 20 is given a bus number 1 while the bus between the CPU (CPU 1) 10 and the EESV (EESV 1) 20 is given a bus number 11 (see FIG. 6C).

When the CPU (CPU 0) 10 searches buses, the generating unit 51 assigns temporary bus numbers to devices belonging to the same group ID and stores the temporary bus numbers into the second table, which is a conversion table (see FIG. 6B). Note that the generating device 51 identifies the target group (i.e., Group 0 in this example) by searching the third table for the sender MAC address contained in the Ethernet frame into which a bus search request from the CPU (CPU 0) 10 is encapsulated.

Temporary bus numbers are determined by adding the local bus number plus 1 to the bus number for the EEIO 54. The bus number for the EESV (EESV 0) 20 is 1, and accordingly the bus number for the EEIO 54 is 2. Thus, the bus numbers for the bridge (Bridge 0) 61, the bridge (Bridge 1) 61, and the I/O device (I/O Device 0) 70 are 3, 4, 4 and 5 respectively (see FIG. 6C). The temporary bus number for the I/O device (I/O Device 1) 70 is not stored because it belongs to the different group ID.

Subsequently, the CPU (CPU 0) 10 assigns the bus number to the bridge (Bridge 0) 61. As the bridge (Bridge 0) 61 belongs to the group ID 0, the CPU (CPU 0) 10 stores into the second table the bus number 3 for the bridge (Bridge 0) 61. Similarly, the CPU (CPU 0) 10 stores into the second table the bus number 4 for the bridge (Bridge 1) 61, the bus number 4 for the bridge (Bridge 2) 61, and the bus number 5 for the I/O device (I/O Device 0) 70.

The bus number for the I/O device (I/O Device 1) 70 is not stored because it belong to the group ID 1. The process times out, and the CPU (CPU 0) 10 therefore recognizes that there is no device under the bridge (Bridge 2) 61.

Figure 7C:
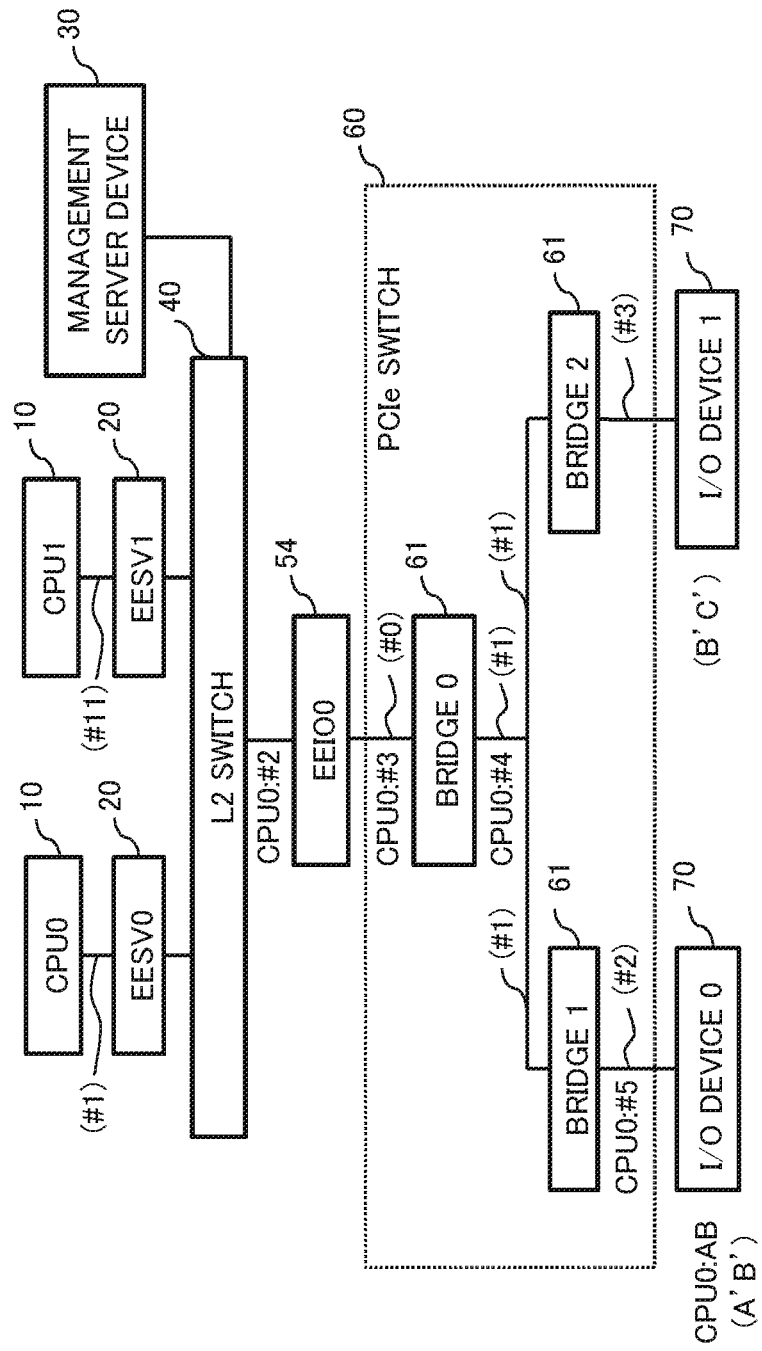
FIG. 7C illustrates an example configuration of the input/output control system existing during the same process as in FIG. 7A.

Next, upon receipt of a configuration write instruction for the I/O device (I/O Device 0) 70 from the CPU (CPU 0) 10, the generating unit 51 assigns the address to the I/O device (I/O Device 0) 70 (see FIG. 7C). The EEIO 54 writes the address, e.g., address AB, which is a logical address obtained by analyzing the configuration write instruction as received, into the second table. The generating unit 51 assigns addresses to the bridge (Bridge 1) 61, the bridge (Bridge 2) 61, and the bridge (Bridge 0) 61 in a similar manner (see FIGS. 7A and 7B). Note that the generating unit 51 assigns an address 0 to the bridge (Bridge 2) 61. This is because no device is recognized to be present under the bridge (Bridge 2) 61.

Figure 8C:
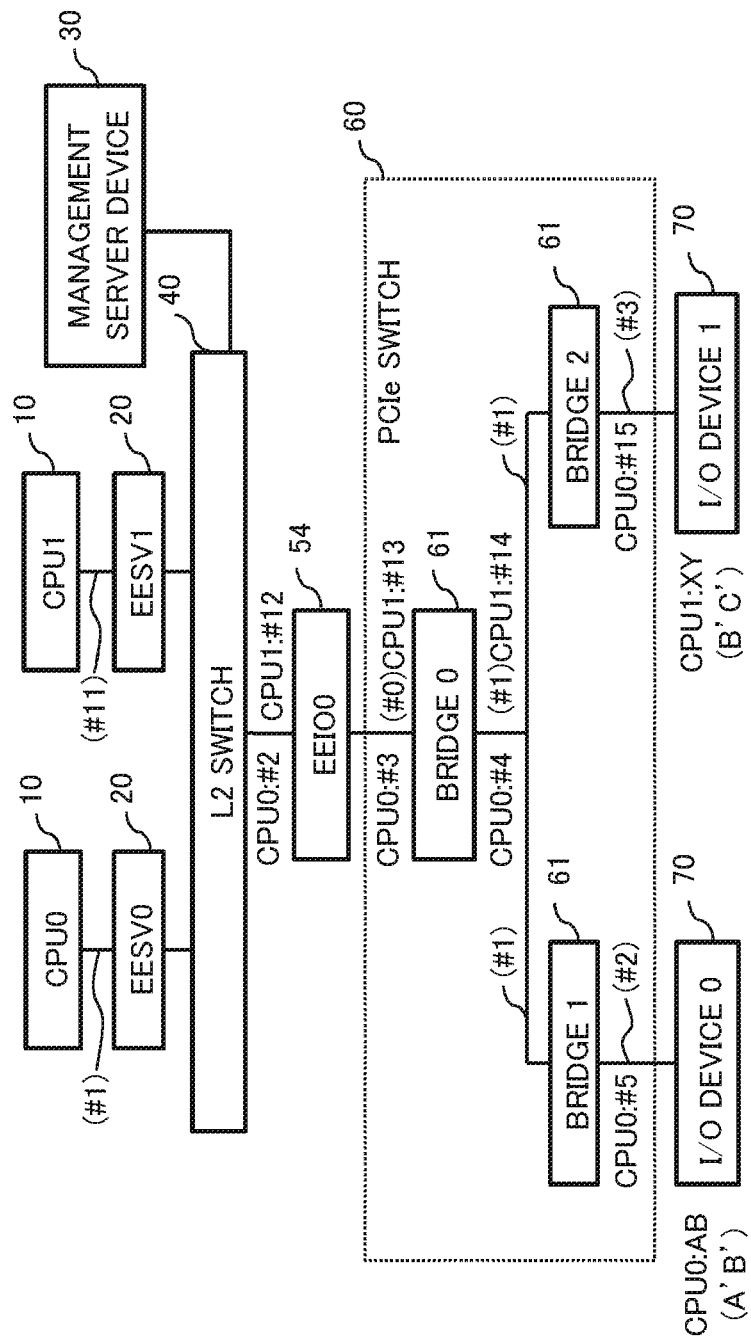
FIG. 8C illustrates an example configuration of the input/output control system existing during the same process as in FIG. 8A.

The generating unit 51 operates in the same way as above when assigning the bus numbers and the addresses in response to the access from the CPU (CPU 1) 10 (see FIG. 8C). Note that, when there is the access from the CPU (CPU 1) 10, the generating unit 51 recognizes the target group is Group 1 based on the sender MAC address contained in the Ethernet frame into which the access request is encapsulated as well as on the information stored in the third table.

For the CPU (CPU 1) 10, the bus number for the EESV (EESV 0) 20 is 11, and thus the bus number for the EEIO 54 is 12. Accordingly, the bus numbers for the bridge (Bridge 0) 61, bridge (Bridge 2) 61, and I/O device (I/O Device 1) 70 are 13, 14 and 15 respectively (see FIGS. 8B and 8C). In addition, upon receipt of a configuration write instruction for the I/O device (I/O Device 1) 70 from the CPU (CPU 1) 10, the generating unit 51 assigns the address to the I/O device (I/O Device 1) 70. The EEIO 54 writes an address, e.g., address XY, which is obtained by analyzing the configuration write instruction as received, into the second table (see FIG. 8B).

<Operations in Input/Output Execution Phase>

FIG. 9 is a flowchart showing example operations of the input/output control system 80 during the input/output execution phase.

First, the CPU 10, e.g., the CPU (CPU 0) 10, issues a Transaction Layer Packet (TLP) in order to access the I/O device (I/O Device 0) 70 (S1). The TLP includes the input/output instruction.

The TLP is received by the EESV 20. Specifically, for example, if the CPU (CPU 0) 10 issues the TLP, the EESV (EESV 0) 20 receives the TLP. The EESV 20 encapsulates the received TLP into the Ethernet frame and sends it to the L2 switch 40 (S2). The L2 switch 40 handles the routing of the Ethernet frame based on the MAC address and sends the frame to the EEIO 54 (S3).

The converting unit 53 in the EEIO 54 reads the sender MAC address from the received Ethernet frame (S4). The read address is the MAC address of the EESV (EESV 0) 20.

The converting unit 53 in the EEIO 54 obtains the group ID by searching the third table, which is the conversion table, based on the MAC address read out as above. Specifically, for example, the converting unit 53 in the EEIO 54 obtains the group ID 0 if it searches the third table based on the MAC address of the EESV (EESV 0) 20. Subsequently, the converting unit 53 obtains the address of the input/output target I/O device 70 from the input/output instruction included in the TLP. The converting unit 53 obtains the local address of the I/O device 70 by sequentially searching the second table and the first table, which are conversion tables, based on the address and the group ID as obtained above. In addition, the converting unit 53 converts the address of the I/O device 70 in the input/output instruction included in the TLP into the local address, and then outputs the converted TLP to the PCIe switch 60 (S5).

The PCIe switch 60 handles the routing of the received TLP based on the local address and sends the TLP to the I/O device 70 (S6).

Finally, the I/O device 70 executes the received TLP (S7).

<Other Operations>

Some types of input/output instructions issued by the CPU 10 may require the EEIO 54 to respond by itself instead of passing the packet to its subordinate devices.

For example, supposing that the CPU 10 is going to read the address or the bus number retained in the I/O device 70, the CPU 10 would read the local address or the local bus value if the packet were passed. To prevent this, the converting unit 53 in the EEIO 54 makes a response by reading and returning the logical address or the like that is stored in the conversion table (second table).

Or, supposing that the CPU 10 is going to write the address or the bus number into the I/O device 70, the local address or the local bus value retained in the I/O device 70 would be overwritten if the packet were passed. To prevent this, the converting unit 53 in the EEIO 54 makes a response by writing the address specified in the write instruction into the conversion table (second table) as the logical address.

The converting unit 53 uses the conversion table to convert the address or the bus number included in a packet that involves the addresses or the bus numbers such as for address routing or ID routing, but makes no conversion on any other packets.

<Effect>

The input/output control device 50 allows for adding the I/O devices 70 at low cost while maintaining the flexibility of configuration of the input/output control system 80.

This is because one input/output control device 50 divides the I/O devices 70 and the CPUs 10 connected to the device 50 into the plurality of groups and allows the CPU 10 to access the I/O device 70 belonging to the same group based on its own address. Accordingly, the I/O device 70 can be added to any of the plurality of groups by connecting the I/O device 70 to one input/output control device 50. An additional input/output control device 50 may not be necessarily provided. To accomplish this, the converting unit 53 in the input/output control device 50 converts the address for each group into the local address unique to the I/O device 70 and transfer the converted address to the PCIe switch 60.

The input/output control device 50 imposes no restriction on an input/output request issued by the CPU 10 while maintaining the flexibility of configuration of the input/output control system 80. The CPU 10 can also make a request of address change or the like related in the I/O devices 70 within the group.

This is because the generating unit 53 can transfer an access to a lower-level device or respond to an access by itself depending on the type of the access.

Example Variations

The Ethernet technology connecting between the EESV 20 and the EEIO 54 may be in a form other than the L2 switch 40. In addition, any other communication protocol may be used.

Furthermore, an input/output interface other than PCI Express, e.g., PCI, may be used. In this case, the PCIe switch should be replaced by an input/output switch for such other interface.

Second Exemplary Embodiment

Figure 10:
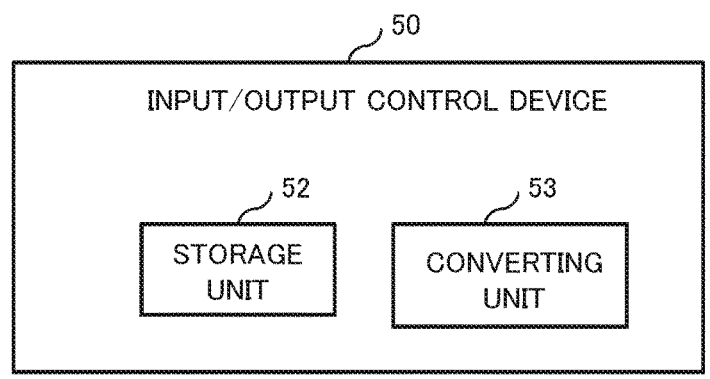
FIG. 10 illustrates a configuration of an input/output control device according to a second exemplary embodiment of the present invention.
Figure 11:
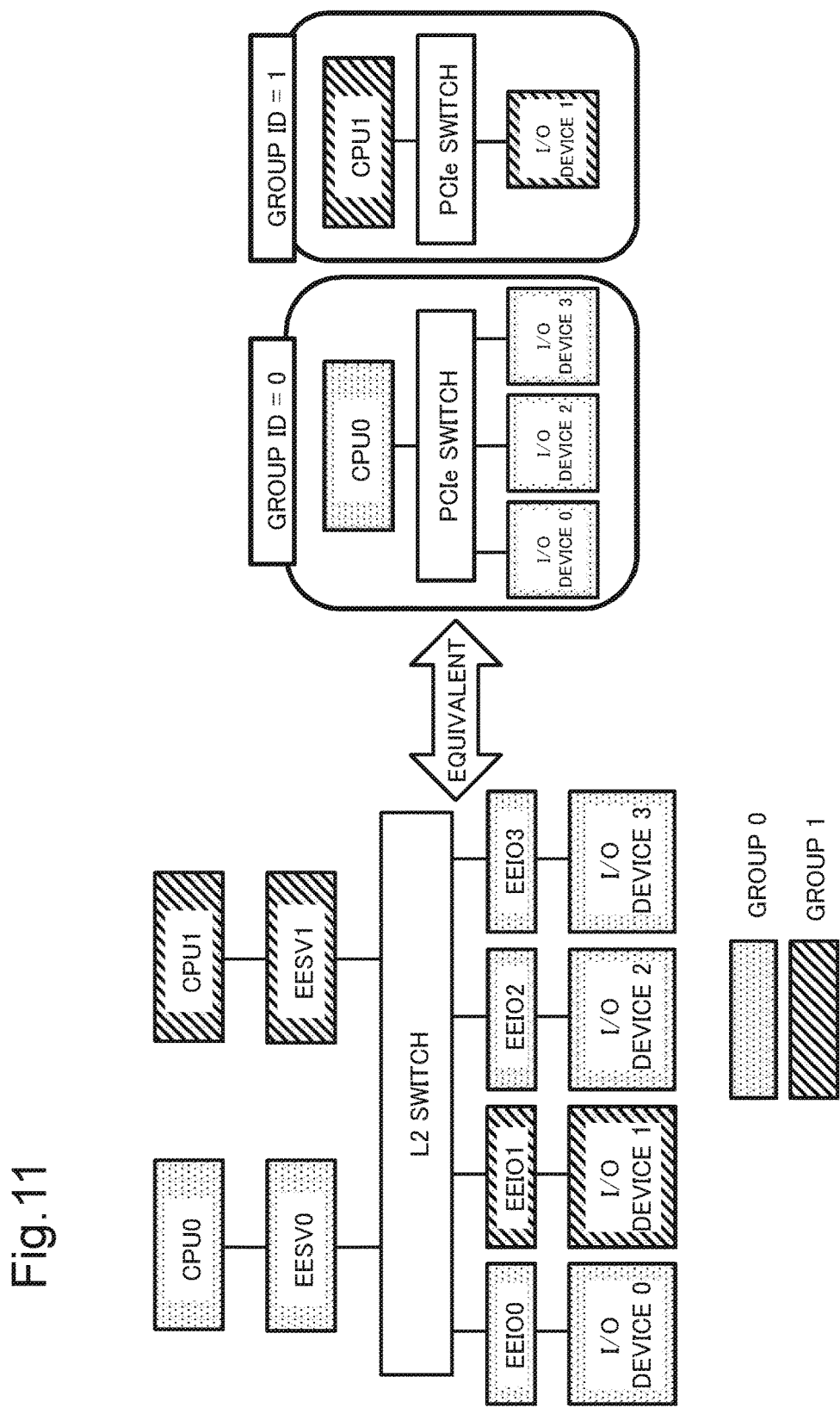
FIG. 11 is an explanatory view illustrating a problem posed by related arts.
Figure 12:
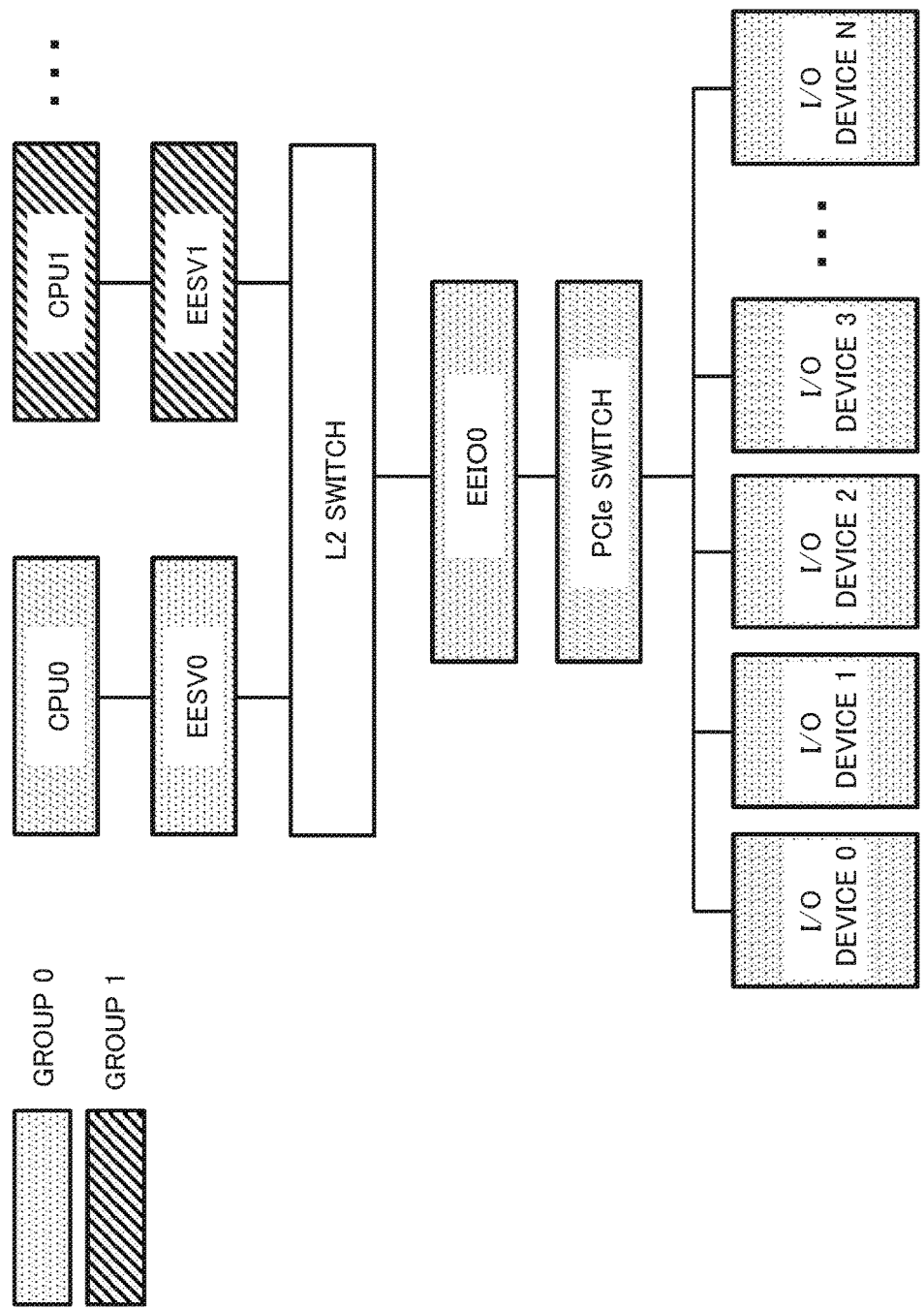
FIG. 12 is an explanatory view illustrating another problem posed by related arts.

FIG. 10 illustrates a configuration of an input/output control device 50 according to a second exemplary embodiment of the present invention. The input/output control device 50 is connected to an input/output switch which transfers a received input/output instruction to an input/output device whose local address is specified in the instruction.

The input/output control device 50 includes a storage unit 52 and a converting unit 53. The storage unit 52 stores specific information to specifying a processor as well as storing a conversion table for converting a logical address of an input/output device into a local address, with the specific information and the conversion table each being associated with a device group that includes the processor and the input/output device. The converting unit 53 identifies the device group based on the specific information about a sender processor which information is obtained when an input/output instruction is received. In addition, the converting unit 53 converts the logical address included in the input/output instruction to the local address that is obtained from the conversion table for the identified group, and then sends the input/output instruction to the input/output switch.

The input/output control device 50 allows for adding the I/O devices 70 at low cost while maintaining the flexibility of configuration of the input/output control system 80.

This is because one input/output control device 50 divides the I/O devices 70 and the CPUs 10 connected to the device 50 into the plurality of groups and allows the CPU 10 to access the I/O device 70 belonging to the same group based on its own address. Accordingly, the I/O device 70 can be added to any of the plurality of groups by connecting the I/O device 70 to one input/output control device 50. The additional input/output control device 50 may not be necessarily provided. To accomplish this, the converting unit 53 in the input/output control device 50 converts the address for each group into the local address unique to the I/O device 70 for transfer the input/output instruction to the input/output switch.

The present invention has been described with reference to exemplary embodiments, but the invention is not limited to these embodiments. Various modification of the present invention that could be understood by those skilled in the art may be made to configurations or details of the invention within the scope of the invention.

The invention claimed is:

1. An input/output control device connected to an input/output switch which transfers a received input/output instruction to an input/output device whose local address is specified in the input/output instruction, the input/output control device comprising:
a memory that stores specific information about a processor as well as storing a conversion table for converting a logical address of the input/output device into the local address, with the specific information and the conversion table each being associated with a group ID (Identification) of a device group which includes the processor and the input/output device; and
circuitry which has a configuration to identify the group ID of the device group from the specific information about a processor of sender which information is obtained when an input/output instruction is received, convert the logical address included in the input/output instruction into the local address which is obtained from the conversion table for the identified group ID of the device group, and send the input/output instruction to the input/output switch,
wherein the local address is associated with an input/output device ID identifying the input/output device, the input/output device ID including a bus number representing a bus to which the input/output device is connected.

2. The input/output control device according to claim 1, wherein the processor is connected to a network which is connected via a bridge device, and
the circuitry receives from the network a frame including the input/output instruction and identifies the processor of sender which sent the input/output instruction based on an address of a sender bridge device which sent the frame as received.

3. The input/output control device according to claim 1, wherein the circuitry assigns the local address to the input/output device being connected under the circuitry, stores the local address into the conversion table, receives an instruction from the processor to assign the address to the input/output device, and stores an address included in the instruction into the conversion table as the logical address.

4. The input/output control device according to claim 1, wherein the circuitry, if the received input/output instruction is an instruction to change the address of the input/output device, rewrites the conversion table without transferring the received input/output instruction to the input/output switch.

5. An input/output control system comprising:
the input/output control device according to claim 1;
the input/output switch according to claim 1;
a layer 2 switch that implements a network; and
a bridge device and a processor that are connected to the layer 2 switch.

6. A method for controlling input/output, the method comprising:
by circuitry,
storing, into a memory, specific information about a processor as well as storing a conversion table for converting a logical address of an input/output device into a local address, with the specific information and the conversion table each being associated with a group ID (Identification) of a device group which includes the processor and the input/output device; and
identify the group ID of the device group from specific information about a processor of sender which information is obtained when an input/output instruction is received,
convert the logical address included in the input/output instruction into the local address which is obtained from the conversion table for the identified group ID of the device group, and
sending the input/output instruction to an input/output switch which transfers the instruction to the input/output device at the local address specified in the input/output instruction,
wherein the local address is associated with an input/output device ID identifying the input/output device, the input/output device ID including a bus number representing a bus to which the input/output device is connected.

7. The method for controlling input/output according to claim 6,
wherein the circuitry receives a frame from a network to which the processor is connected via a bridge device, and identifies, the processor of sender which sent the input/output instruction based on an address of the bridge device of sender which sent the frame as received.

8. The method for controlling input/output according to claim 6,
wherein the circuitry assigns the local address to the input/output device being connected under the circuitry, stores the local address into the conversion table, receives an instruction from the processor to assign the address to the input/output device, and stores an address included in the instruction into the conversion table as the logical address.

9. The method for controlling input/output according to claim 6,
wherein the circuitry, if the received input/output instruction is an instruction to change the address of the input/output device, rewrites the conversion table without transferring the received input/output instruction to the input/output switch.

* * * * *